United States Patent
Hintzen et al.

(10) Patent No.: US 9,221,314 B2
(45) Date of Patent: Dec. 29, 2015

(54) WHEEL SUSPENSION FOR A MOTOR VEHICLE

(71) Applicant: FORD GLOBAL TECHNOLOGIES, LLC, Dearborn, MI (US)

(72) Inventors: Ralf Hintzen, Aachen (DE); Thomas Gerhards, Niederzier (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/600,902

(22) Filed: Jan. 20, 2015

(65) Prior Publication Data

US 2015/0202937 A1 Jul. 23, 2015

(30) Foreign Application Priority Data

Jan. 20, 2014 (DE) .......................... 10 2014 200 881

(51) Int. Cl.
*B60G 3/20* (2006.01)
*B60G 17/005* (2006.01)
*B60K 7/00* (2006.01)

(52) U.S. Cl.
CPC ................ *B60G 3/20* (2013.01); *B60G 17/005* (2013.01); *B60K 7/0007* (2013.01); *B60K 2007/0038* (2013.01)

(58) Field of Classification Search
CPC ............ B60G 17/005; B60G 17/0164; B60G 2200/18; B60K 7/0007; B60K 2007/0038
See application file for complete search history.

(56) References Cited

U.S. PATENT DOCUMENTS

| | | | | |
|---|---|---|---|---|
| 5,951,030 | A | * | 9/1999 | Butler ...................... 280/86.751 |
| 7,246,806 | B2 | * | 7/2007 | Andre et al. ........... 280/124.106 |
| 2005/0179225 | A1 | * | 8/2005 | Andre et al. ........... 280/124.106 |
| 2013/0161920 | A1 | * | 6/2013 | Park et al. .............. 280/124.128 |

* cited by examiner

*Primary Examiner* — Drew Brown
(74) *Attorney, Agent, or Firm* — Jones Robb, PLLC; Raymond L. Coppiellie (57) ABSTRACT

A wheel suspension for a wheel of a motor vehicle includes a wheel guide arm to which a wheel of the motor vehicle may be rotatably mounted remotely from the vehicle structure of the motor vehicle. The wheel guide arm may be attached via a point of attachment to an articulation member. The articulation member may be connected to the vehicle structure via at least one connecting member and be movably mounted relative to the vehicle structure. The wheel guide arm may be attached at the point of attachment to the articulation member via a changeable rotary joint. The rotary joint may be rotatable in a first switch position and fixed in terms of rotation in a second switch position.

15 Claims, 4 Drawing Sheets

FIG. 1

PRIOR ART

FIG. 2A

PRIOR ART

FIG. 4

WHEEL SUSPENSION FOR A MOTOR VEHICLE

CROSS REFERENCE TO RELATED APPLICATIONS

This application claims priority to German Application No. 102014200881.6, filed Jan. 20, 2014, the content of which is hereby incorporated by reference in its entirety.

TECHNICAL FIELD

The present disclosure relates to a wheel suspension for a motor vehicle, such as a wheel suspension for a motor vehicle.

BACKGROUND

A wheel suspension for motor vehicles is used to support a wheel mounted to the wheel suspension and manage forces transmitted to the wheel. Conventional wheel suspensions have contributed to significant improvement in managing forces transmitted to a wheel during various states of travel of a motor vehicle. However, further improvements may be made to wheel suspensions to enhance management of forces transmitted to the wheel during various states of motor vehicle travel that may entail differing vehicle dynamics so that an enhanced feeling of comfort may be imparted to occupants of the motor vehicle.

SUMMARY

In accordance with various exemplary embodiments, the present disclosure provides a wheel suspension for a motor vehicle. The wheel suspension comprises a wheel guide arm, an articulation member, and at least one connecting member. A wheel of the motor vehicle may be rotatably mounted to the wheel guide arm. The wheel guide arm may be attached to the articulation member. The at least one connecting member may be mounted to a structure of the vehicle. The articulation member may be connected to, and movable relative, to the vehicle structure via the at least one connecting member. The wheel guide arm may be attached to the articulation member at a point of attachment by a rotary joint. The rotary joint may be rotatable in a first position and fixed in terms of rotation in a second position.

In accordance with various exemplary embodiments, the present disclosure further provides a wheel suspension for a motor vehicle. The wheel suspension comprises a wheel guide arm, at least one connecting member, and an articulation member. A wheel of the motor vehicle may be rotatably mounted to the wheel guide arm. The at least one connecting member may be pivotably mounted to the vehicle structure. The articulation member may be connected to the vehicle structure via the at least one connecting member. The articulation member may be connected to the wheel guide arm in a changeable manner so that a vertical position of a pivot point of the wheel guide arm may be changed.

In accordance with various exemplary embodiments, the present disclosure further provides a motor vehicle. The motor vehicle comprises a wheel, a wheel guide arm on which the wheel is rotatably mounted, an articulation member, and at least one connecting member. The wheel guide arm may be attached to the articulation member. The at least one connecting member may be pivotably mounted to a structure of the vehicle. The articulation member may be connected to, and movable relative to, the vehicle structure via the at least one connecting member. The wheel guide arm may be attached to the articulation member at a point of attachment by a rotary joint. The rotary joint may be rotatable in a first position and may be fixed in terms of rotation in a second position.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

Other advantageous details and effects of the invention are explained in detail below using an exemplary embodiment illustrated in the following figures. In the figures.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

It is to be noted that the features individually mentioned in the following description can be combined with each other in any technically meaningful manner and reveal further embodiments of the disclosure.

In modern rear wheel suspensions, twist beam axles or trailing arm axles and/or suspension blades are generally used. These types of wheel suspensions have very good operating characteristics and are particularly suitable for mass-produced vehicles due to the relatively low production costs of the suspensions. Although these wheel suspensions are generally very adaptable and may be designed to meet a wide range of requirements, the vertical position of the articulation body of the suspension is restricted. For example, a suspension member, such as a trailing arm, twist beam axle, and/or suspension beam, can be fastened via a bearing pin to a vehicle structure for receiving a bearing bush for the articulation of a wheel guide arm.

To achieve good driving dynamics in terms of the best possible driving comfort, it is desirable to locate a vertical position of an articulation body of a suspension as high as possible in a motor vehicle. For example, it can be desirable to locate a vertical position of the articulation body as high as possible during braking procedures and in the case of impact loads, such as compression movements of the wheel mounted rotatably on the vehicle structure by the wheel suspension. However, the vertical position of the articulation body on the structure side is limited, such as due to the seat shell of the rear seats in the motor vehicle. A high point of articulation on the structure side, such as a point higher than the wheel center point of the wheel retained by the wheel suspension, enables the wheel to pull back in a direction counter to the driving direction of the motor vehicle during spring compression movements of the wheel. This behavior of the suspension is useful for comfortable driving dynamics, because impacts acting on the wheel, such as impacts due to traveling against transverse edges, transverse joints or the like, are absorbed in a more flexible manner. Moreover, such behavior of the wheel suspension assists in the reduction of a pitching movement of the vehicle structure, which usually occurs during the braking of the vehicle.

Wheel hub motors may be used in electric vehicles. Wheel hub motors are electric motors accommodated inside the space of the driven wheel, surrounded by the rim of the wheel, and supported on a wheel carrier to which the wheel is rotatably mounted. The wheel carrier in turn is retained by the wheel guide arm of the twist beam axle or trailing arm axle and/or suspension beam of the suspension. Due to the high vertical position of the articulation body on the structure side, at which the wheel is articulated relative to the vehicle structure via the wheel guide arm, an undesired upward movement of the vehicle structure can occur during acceleration. This is because during acceleration the force acting on the contact surface between the tire of the driven wheel and the road surface produces a pitching moment that is not fully supported by the force component passing through the wheel ground contact point. As a result, the articulation body and the remaining vertical component of the force act directly on the structure via the bodywork suspension, resulting in lifting of the vehicle structure. This effect is increased as the vertical position of the articulation body on the vehicle structure is located at higher positions relative to the road surface. To reduce the upward movement of the vehicle structure during acceleration of the motor vehicle due to the wheel hub motors, it is desirable for the vertical position of the articulation body to be lowered. However, this strategy conflicts with the strategy to provide improved driving comfort during braking, as explained above.

In view of the considerations discussed above, this disclosure contemplates a wheel suspension for a motor vehicle to enhance the driving dynamics of the motor vehicle. The wheel suspension may be used for various wheels of a motor vehicle, such as a front wheel or a rear wheel. According to an exemplary embodiment, the wheel suspension is used with a rear wheel of a motor vehicle. The wheel suspension may be used with vehicles with various types of motor vehicle drive configurations, such as front wheel drive, rear wheel drive, and all-wheel drive configurations.

The various exemplary embodiments described herein contemplate a wheel suspension for a motor vehicle. In accordance with the present disclosure, a wheel suspension can include a wheel guide arm to which a wheel of the motor vehicle may be rotatably mounted, at least one connecting member movably mounted to the vehicle structure and connected to the wheel guide arm, and an articulation member connected to the vehicle structure via the connecting member. The articulation member is connected to the wheel guide arm in a changeable manner so that a vertical position of a pivot point of the wheel guide arm may be changed. For example, the wheel guide arm may be connected to the articulation member via a rotary joint that may be switched between positions to control the rotation state of the rotary joint. A controller may be coupled to the rotary joint to control whether the rotary joint is in a first switch position (e.g., unlocked) or in a second switch position (e.g., locked).

According to an exemplary embodiment of the present disclosure, a wheel suspension for a wheel of a motor vehicle includes a wheel guide arm that rotatably mounts the wheel remotely from the body of the vehicle (e.g., vehicle frame). The wheel guide arm can be attached to the vehicle body via an articulation member via, for example a bearing pin that receives a bearing bush or a bearing shell for receiving a ball joint. The wheel guide arm may be, for example, a trailing arm of a twist beam axle, a trailing arm axle, and/or a suspension beam. The articulation member in turn is connected to the vehicle body by at least one connecting member that is movably mounted relative to the vehicle body.

As used herein, a connecting member is to be generally regarded as a structural member that allows and/or permits the relative movement of the articulation member relative to the vehicle structure. For example, a connecting member may be a beam, rod, or other structural member that is connected to the articulation member, such as at one end of the connecting member, and connected to the vehicle body (e.g., frame), such as at another end of the connecting member.

Connections between the connecting member and the articulation member and vehicle body may be made via, for example, pivotable connections that permit the connection member and the articulation member to rotate freely relative to one another and the connecting member to rotate freely relative to the vehicle body. Such connections may include, for example, a bushing, a ball joint, a bearing (e.g., a rubber-metal bearing), or other type of connection familiar to one of ordinary skill in the art that would permit rotation between the connection member and the articulation member, or between the connection member and the vehicle body.

In contrast to conventional wheel suspensions attached substantially rigidly to the vehicle body, mobility of the articulation member relative to the vehicle body permits control over the location of the point of articulation of the wheel guide arm. As a result, the comfort for a vehicle occupant may be enhanced by controlling the location of the point of articulation based upon the current driving situation and/or driving dynamics of the motor vehicle. For example, the location of the point of articulation may be controlled based upon whether the vehicle is accelerating or braking.

According to an exemplary embodiment, the articulation member may be permitted to move relative to the vehicle body so that forces acting on the wheel suspension due to the vehicle driving dynamics may displace the articulation member, resulting in the point of articulation of the wheel guide member moving relative to the vehicle body to a position that is desirable or optimal for driving comfort. In accordance with the present teachings, a displacement of the articulation member relative to the vehicle body is greater than the amount of displacement that could be provided by elastic deformation of suspension components, such as, for example, rubber buffers.

According to an exemplary embodiment, the wheel guide arm is attached to the articulation member by a changeable rotary joint. For example, the rotary joint may be a lockable rotary joint that can change between an unlocked state and a locked state. The rotary joint may be, for example, a rotary bearing, a bushing, a ball joint or other type of rotary joint familiar to one of ordinary skill in the art that includes a locking device, such as, for example, a pin, a gear, a latch, a brake (e.g., friction brake, electromagnetic brake, or other type of brake), or other mechanism to prevent rotation of the rotary joint. The rotary joint is rotatable in a first switch position and is fixed, in terms of rotation, in a second switch position, such as by controlling the locking device of the rotary joint.

A controller may be operatively coupled to the rotary joint to control the switch position of the rotary joint, such as according to the vehicle dynamics of the motor vehicle including the wheel suspension. For example, the controller may control the switch position of the rotary joint in accordance with whether the vehicle is in an acceleration state or other state. The controller may place the switch position of the rotary joint in an unlocked state when the vehicle is accelerating and maintain the switch position in a locked state when the vehicle is not accelerating. The controller may be a controller dedicated to control of the rotary joint, which may be in communication with other controller(s) of a vehicle, or may be a part (e.g., section) of a vehicle controller that controls other systems/components of a motor vehicle.

In particular, the configuration of the controller is subject to a variety of implementation-specific variations. For example, in some embodiments, the functions described in reference to the controller may be performed across multiple control units or among multiple components of a single controller. Further, the controller may include one or more structural components (e.g., microprocessors) that provide the function of a controller. Any controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by a control system or controller to operate the logic or portions of the logic presented in the methods disclosed herein. For example, in certain embodiments, the controller may include computer code disposed on a computer-readable storage medium or a process controller that includes such a computer-readable storage medium. The computer code may include instructions, for example, for initiating a control function to change the switch position of the rotary joint based on feedback received from another component of the vehicle.

The controller may receive one or more signals indicating the driving state of a motor vehicle and determine whether the switch position of the rotary joint should be in the locked or unlocked state. According to an exemplary embodiment, the controller may be in signal communication with a device that indicates whether the vehicle is accelerating. For example, the controller may be operatively associated with the acceleration pedal, the engine, or other device to determine whether the motor vehicle is accelerating. Based upon the signal(s) indicative of, for example, the presence or absence of acceleration, received from one or more of the devices, or about to occur, the controller may determine whether the rotary joint should be in a locked or unlocked state.

The changeable rotary joint permits a situation-dependent displacement of the articulation point of the wheel guide arm. As a result, a vertical position of the articulation point may be changed by controlling the locking state of the rotary joint. In the first switch position in which the rotary joint is rotatable (i.e., unlocked), the point of attachment of the wheel guide arm on the articulation member acts as a pivot point for the wheel guide arm. In the second switch position the rotary joint is fixed in terms of rotation (i.e., locked) and thus the wheel guide arm and the articulation member form a unit that is torsionally rigid. In the second switch position, the pivot point for a unit formed by the wheel guide arm and the articulation member may be formed by an instantaneous center of rotation for the amount of movement the articulation member is free to move relative to the vehicle structure Accordingly, the pivot point for the articulation of the wheel guide arm on the vehicle structure may be switched, depending on a current driving situation of the motor vehicle to improve the driving comfort provided by the wheel suspension in different driving situations.

Thus, for example, during acceleration of a motor vehicle, including during acceleration by means of an (e.g., electric) wheel hub motor, the effective point of articulation of the wheel guide arm for the wheel suspension may be lowered by switching the rotary joint to the first switch position (i.e., unlocked), which is not fixed in terms of rotation. As a result, the instantaneous center of rotation of the articulation member in this switch position is always located below the point of attachment of the wheel guide arm to the articulation member. In all other driving situations of the motor vehicle, the changeable rotary joint is in the second rotatable switch position (i.e., locked) so that the point of attachment of the wheel guide arm to the articulation member, which is located higher in comparison with the previously mentioned instantaneous center of rotation, is the effective pivot point for the wheel guide arm on the vehicle structure. In this manner, the vertical position of the effective pivot point can be controlled, such as via control of the switching position of the rotary joint, and the lifting of the vehicle structure during acceleration, for example, due to wheel hub motors, may be reduced or even entirely eliminated. In other driving situations of the motor vehicle, such as during braking or when the effects of impacts on the wheel are transmitted to the wheel suspension, for example when traveling against transverse edges or transverse joints, the rotatable switch position of the rotary joint is set (i.e., locked) so the effective pivot point of the wheel guide arm has a relatively high vertical position on the vehicle structure, which in this case corresponds to the point of attachment of the wheel guide arm on the articulation member. As a result, the riding comfort for occupants of the vehicle is substantially improved.

According to an exemplary embodiment, the instantaneous center of rotation of the articulation member during its movement relative to the vehicle structure is not located at the point of attachment of the wheel guide arm to the articulation member. In other words, the articulation member does not perform a purely rotational movement about the point of attachment of the wheel guide arm to the articulation member. Because the instantaneous center of rotation is located remotely from the point of attachment of the wheel guide arm to the articulation member, such as in the vertical direction below or above the point of attachment, the articulation member instead performs a movement that includes a translational movement and a rotational movement relative to the vehicle structure. Because the movement of the articulation member at any time may be described as a rotation about the instantaneous center of rotation, a virtual pivot point of the articulation member may be defined that can be positioned substantially anywhere and may function as the effective pivot point for the wheel guide arm attached to the articulation member. In this manner, the effective pivot point of the wheel guide arm for the wheel suspension (and thus also the wheel retained by the wheel guide arm, remote from the vehicle structure) may be displaced from the vehicle structure to the position of the instantaneous center of rotation, thus facilitating more comfortable driving dynamics.

The present disclosure contemplates two connecting members, which can be configured, for example, as connecting struts. The connecting members can be connected to the vehicle structure in an articulated manner. The articulation member can be configured as a coupler that connects together the two connecting members in an articulated manner so the articulation member is located remotely from the vehicle structure. The four bar linkage formed by the coupler and the two connecting members (with the vehicle body serving as a fourth bar) makes it possible to secure the instantaneous center of rotation of the articulation member and/or the coupler in a simple manner using freely selectable geometric properties of the four bar linkage, such as the length of the coupler and the connecting members and/or the positions of the points of articulation on the vehicle structure and on the coupler. Thus, the driving comfort provided by the wheel suspension is enhanced in the driving situations of the motor vehicle.

According an exemplary embodiment, the spacing of the points of articulation of the connecting members to the vehicle structure (e.g., vehicle body) side is greater than the spacing of the points of articulation between the articulation member and each connecting member, which are remote from the vehicle structure. Conventional rubber-metal bearings (rotary joints) and/or ball joints may be used to form the individual points of articulation. As the instantaneous center of rotation is defined by the point of intersection of the effective lines (e.g., longitudinal axes) of the two connecting members, the instantaneous center of rotation of the articulation member may always be located below the point of attachment of the wheel guide arm to the articulation member. As a result, lifting of the vehicle body, for example, during acceleration of the motor vehicle by means of wheel hub motors, is reduced or eliminated, or the lifting movement is even reversed into a lowering movement, as soon as the instantaneous center of rotation of the articulation member, during the relative movement of the articulation member in relation to the vehicle structure, is the effective pivot point for the wheel guide arm and the wheel mounted thereto.

Further embodiments of the present disclosure provide that the wheel guide arm is a trailing arm, such as a trailing arm of a twist beam axle or a trailing arm axle and/or suspension beam and that the wheel is rotatably mounted to the wheel guide arm via a wheel carrier. A wheel hub motor, such as an electric wheel hub motor, may be supported on the wheel carrier or on the wheel guide arm for driving the wheel.

Figure 1:
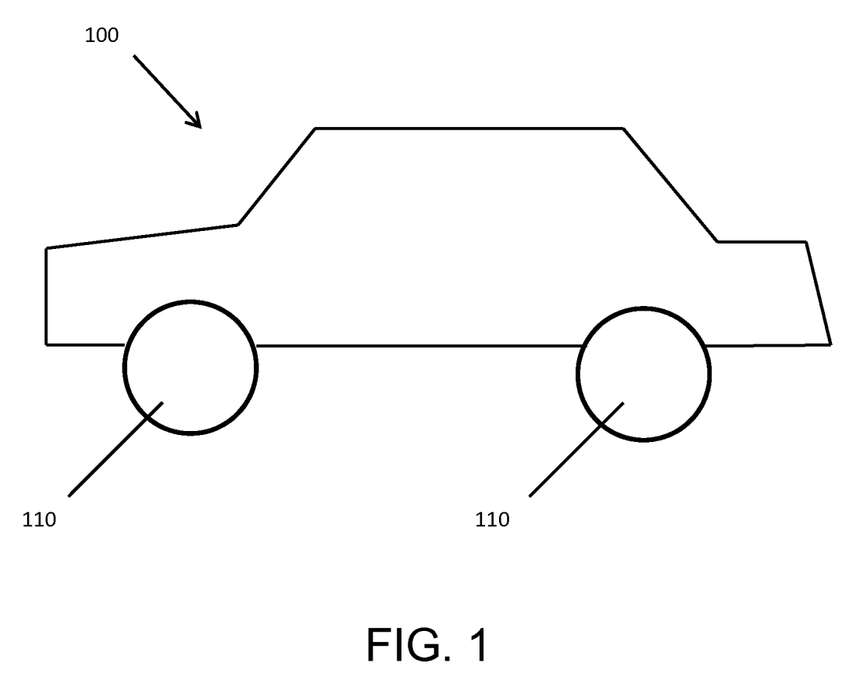
FIG. 1 schematically depicts a side view of a motor vehicle, according to an exemplary embodiment.

Turning now to the drawings, FIG. 1 illustrates an exemplary embodiment of a motor vehicle 100, which includes a plurality of wheels 110. One or more of wheels 110 (e.g., one or more of the front wheels and/or rear wheels) may be mounted to a wheel suspension (not shown in FIG. 1), according to the various exemplary embodiments described herein. The vehicle may have various types of drive configurations, such as, for example, front wheel drive, rear wheel drive, and all-wheel drive configurations.

Figure 2A:
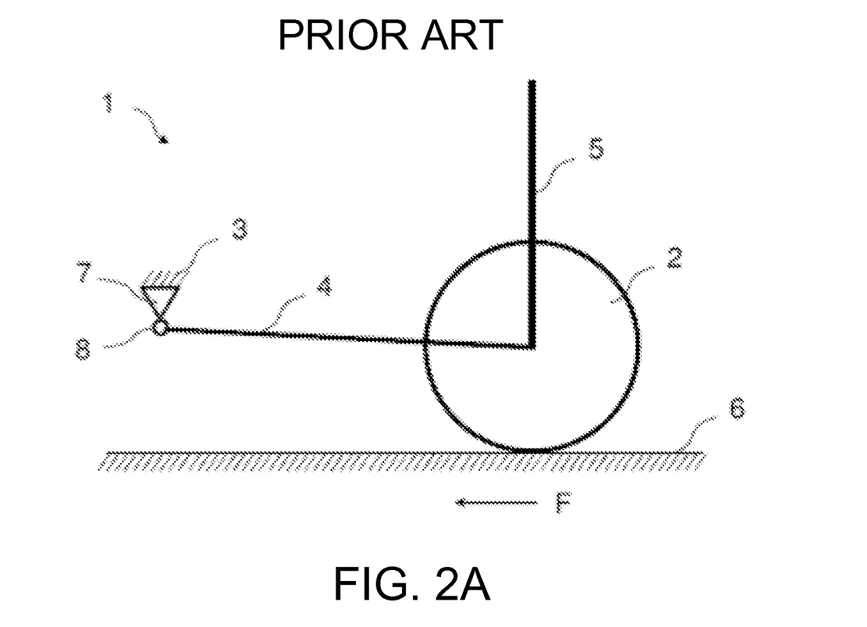
FIG. 2A schematically depicts a side view of a conventional wheel suspension for a wheel of a rear axle of a motor vehicle.
Figure 2B:
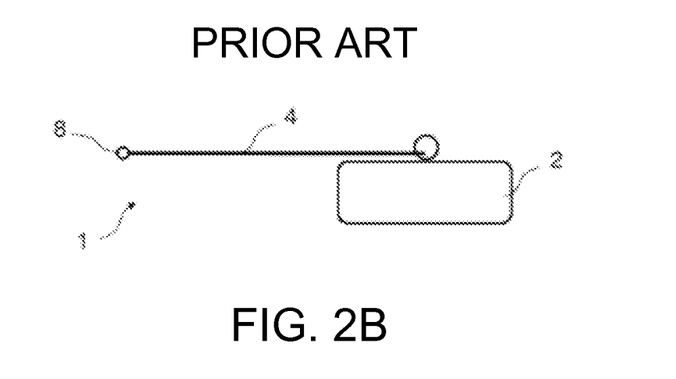
FIG. 2B depicts a plan view of the wheel suspension according of FIG. 2A.

FIGS. 2A and 2B show a side view and a plan view of a conventional wheel suspension 1 for a wheel 2 of a motor vehicle, such as for a wheel 110 of the motor vehicle 100 of FIG. 1. The axle for the wheel suspension 1 shown in FIGS. 2A and 2B may be a trailing arm axle and/or suspension blade of the motor vehicle. The motor vehicle includes a vehicle structure 3 (e.g., vehicle body), which is schematically shown in FIGS. 2A and 2B. The wheel guide arm 4, may be a trailing arm and may be rotatably mounted remotely from the vehicle structure. The wheel 2 is rotatably retained on the wheel guide arm 4, for example, via a wheel carrier (not shown) connected to the end of the trailing arm 4 remotely from the vehicle structure. Moreover, the wheel 2 is supported, in the conventional manner, via a conventional suspension/damper element 5 on the vehicle structure. The wheel 2 travels on a road surface 6 shown in FIG. 2A, wherein the forward direction of travel of the motor vehicle corresponds to the direction of the arrow F.

As schematically depicted in FIG. 2A, the wheel guide arm 4 is attached to an articulation member 7, such as, for example, a bearing pin, for receiving a bearing bush. The attachment at the point of attachment 8 is via a conventional rotary joint that is formed from the bearing pin of the articulation member 7 and the bearing bush rotatably retained thereby, for example a conventional rubber-metal bush. As shown in FIG. 2A, the articulation member 7 is rigidly connected to the vehicle structure 3. As a result, the articulation member 7 is substantially immobile relative to the vehicle structure 3. During compression and/or rebound movements of the wheel 2, the trailing arm 4 consequently pivots about the point of articulation 8. The point of articulation 8 for the wheel guide arm 4 is thus always the pivot point for the configuration depicted in FIGS. 2A and 2B.

If the motor vehicle is driven, for example, by means of a wheel hub motor (not shown) accommodated inside the wheel 2 and ultimately supported on the wheel guide arm 4, due to the relatively high vertical position of the articulation member 7 on the structure side, on which the wheel 2 is rotatably articulated on the vehicle structure 3 via the wheel guide arm 4, the wheel hub motor produces an undesired upward movement of the vehicle structure 3 during acceleration, as the force acting during acceleration on the contact surface between the wheel 2 and the road surface 6 produces a pitching moment that is not fully supported by the force component passing through the wheel ground contact point and articulation member. The remaining vertical component of the force acts via the bodywork suspension directly on the vehicle structure and lifts the vehicle structure. This effect increases as the vertical position of the articulation member 7 is located higher and higher on the vehicle structure 3.

Figure 3A:
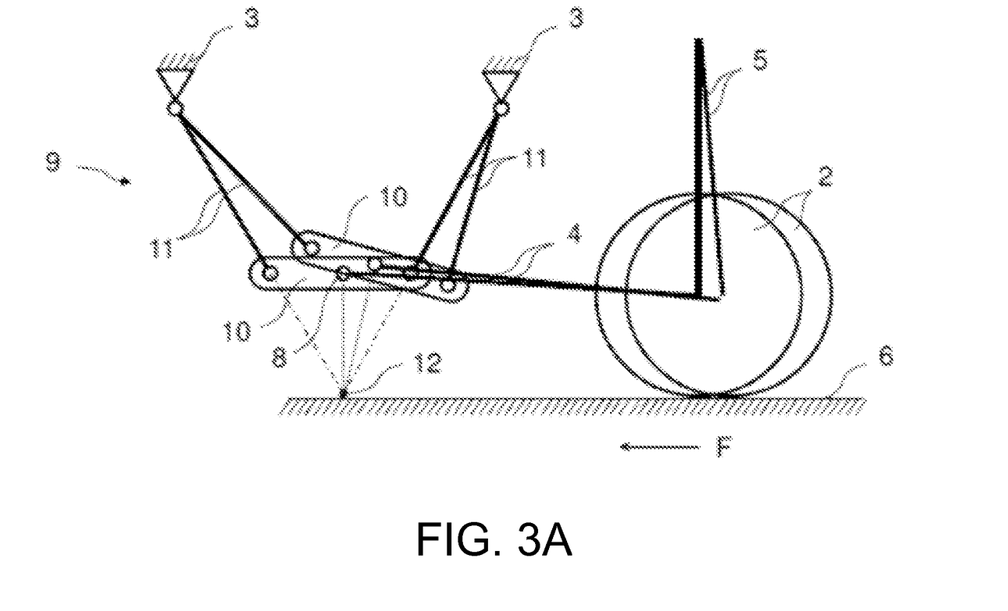
FIG. 3A schematically depicts a side view of a wheel suspension for a wheel of a motor vehicle, according to an exemplary embodiment of the present disclosure.
Figure 3B:
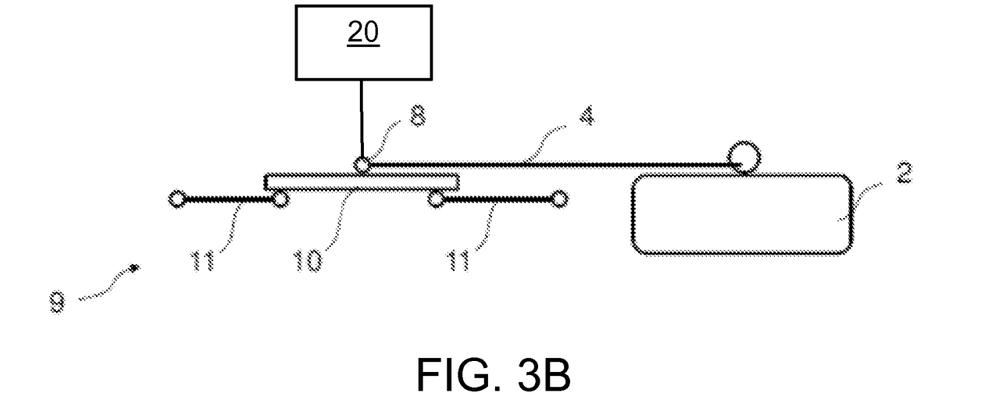
FIG. 3B depicts a plan view of the wheel suspension of FIG. 2A.

FIGS. 3A and 3B show a side view and/or a plan view of a wheel suspension 9, according to an exemplary embodiment of the present disclosure. The side view of FIG. 3A shows two operating positions of the wheel suspension 9, with the first operating position being the operating position shown further to the front relative to the direction of travel F in FIG. 3A (further to the left in FIG. 3A). As may be seen, the wheel guide arm 4, which in this example is configured as a trailing arm of a trailing arm axle and/or suspension blade, is attached at the point of attachment 8 to an articulation member 10. The articulation member 10 may be, for example, an elongated coupler or link.

The articulation member 10 the wheel suspension 9 may be connected to the vehicle structure 3 in an articulated manner on the vehicle structure side, via two connecting members 11, which may be, for example, connecting struts. The two connecting members 11 and the coupler 10 (and the vehicle body) may be considered to form a so-called four bar linkage. The connecting members 11 may be connected in an articulated manner to the vehicle structure 3 and the articulation member 10 may connect together the two connecting members 11 in an articulated manner remotely from the vehicle structure 3. Rubber-metal joints (rotary joints) and/or ball joints or other types of articulated connections may be used as articulated connections between the vehicle structure 3 and the connecting members 11 and between the connecting members 11 and the articulation member 10. As may be seen further with reference to the two operating positions shown in FIG. 3A, the articulation member 10 of the wheel suspension 9 is movably mounted relative to the vehicle structure 3 by the four bar linkage.

The instantaneous center of rotation 12, which is defined by the point of intersection of the lines of action (e.g., longitudinal axes) of the two connecting members 11 in a current operating position, is always located below the point of attachment 8, as shown in the exemplary embodiment of FIG. 3A. This is due, in particular, to the spacing between the points of articulation of the connecting members 11 on the vehicle structure side (e.g., the space between connecting members 11 at the point where the members 11 are connected to the vehicle structure 3) being greater than the spacing between the points of articulation between the articulation member 10 and each connecting member 11, remote from the vehicle structure. The movement of the articulation member 10 relative to the vehicle structure 3 may at any time be described as a purely rotational movement about the instantaneous center of rotation 12.

The wheel guide arm 4 of wheel suspension 9 may be attached at the point of attachment 8 to articulation member 10 via a changeable rotary joint, according to an exemplary embodiment. The rotary joint is rotatable in a first switch position (i.e., unlocked) and is fixed in terms of rotation in a second switch position (i.e., locked). In the first switching position, the wheel guide arm 4 may rotate freely about the point of attachment 8. In the second switching position, the torsionally rigid unit including the wheel guide arm 4 and the articulation member 10 may only rotate about the instantaneous center of rotation 12, which is described herein as the virtual pivot point of the articulation member 10. As a result, it is possible to change between a relatively high pivot point about the point of attachment 8 in the vertical direction (e.g., in the first switch position in which the rotary joint is unlocked) and a relatively low pivot point 12 (instantaneous center of rotation) in the vertical direction (e.g., in the second switch position in which the rotary joint is locked), in order to influence and enhance the driving dynamics of the wheel suspension 9, depending on the current driving situation of the motor vehicle.

A controller 20, schematically depicted in FIG. 3B, may be operatively associated with or coupled to the rotary joint to control the switch position of the rotary joint at the point of attachment 8, according to an exemplary embodiment. As described above, controller 20 may receive one or more signals indicating the driving state of a motor vehicle and determine whether the switch position of the rotary joint should be in the locked or unlocked state. According to an exemplary embodiment, the controller 20 may be in signal communication with a device that indicates whether the vehicle is accelerating. For example, the controller 20 may be operatively associated with the acceleration pedal, the engine, or other device to determine whether the motor vehicle is accelerating. Based upon the signal(s) received indicative of whether acceleration is occurring, or about to occur, the controller 20 may determine whether the rotary joint should be in the locked or unlocked state.

According to an exemplary embodiment, the second switching position of the rotary joint, which is fixed in terms of rotation in FIGS. 3A and 3B, may be used when the motor vehicle is accelerated by means of an electric wheel hub motor (not shown) driving the wheel 2. As a result, the virtual pivot point 12 (instantaneous center of rotation) is the effective pivot point for the group of components including the wheel guide arm 4 and the articulation member 10, which are fixed in terms of rotation. In this manner, the lifting of the vehicle structure 3 during acceleration by means of the wheel hub motor, is minimized or prevented, or even reverses into a lowering movement. According to an exemplary embodiment, during all other driving conditions, such as during braking or during unaccelerated travel of the motor vehicle, the rotary joint is operated in the first switch position (i.e., unlocked position) in which the rotary joint is free to rotate. Thus the effective pivot point for this operating position is the point of attachment 8 of the wheel guide arm 4 to the articulation member 10, which is positioned relatively high in the vertical direction in comparison to the virtual pivot point 12. Such a state is shown in the second operating position of the wheel suspension 9 shown in FIG. 3A (the view further to the right in FIG. 3A relative to the direction of travel F).

Vehicle driving dynamics may be improved not only by switching the rotary joint into the second switch position, which is fixed in terms of rotation, during the acceleration of the motor vehicle, causing lifting of the vehicle structure to be entirely prevented or at least reduced, but also by switching the rotary joint into the first rotatable switch position in all other driving situations of the motor vehicle, in which a high pivot point about the point of attachment 8 is the effective pivot point for the wheel guide arm 4 to the articulation member 10 and the driving dynamics are also improved, so that the wheel 2 is able to move counter to the direction of travel F during the effects of impacts and during braking, as is visible from the second operating position in FIG. 3A, which shows the state of the motor vehicle during braking. The movement of the articulation member 10 suspended in an articulated manner on the vehicle structure 3 by the connecting members 11, during braking counter to the direction of travel F, additionally assists this behavior.

Figure 4:
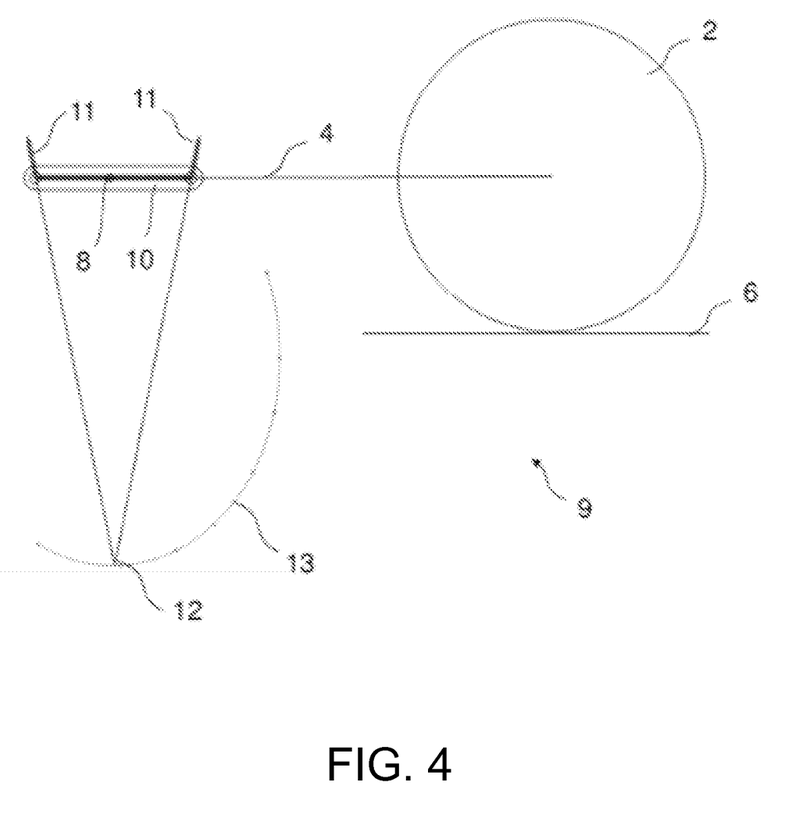
FIG. 4 schematically depicts a side detail of the wheel suspension of FIG. 2A.

FIG. 4 shows a side detail of the wheel suspension 9 according to the exemplary embodiment of FIG. 3A. Illustrated in this view is an instantaneous center of rotation curve 13 that represents the positions of the instantaneous center of rotation 12, depending on the movement of the articulation member 10. It may be seen in FIG. 4 that the instantaneous center of rotation 12, for the movement sequence shown for the articulation member 10, alters its vertical position but always remains below the point of attachment 8 of the wheel guide arm 4 to the articulation member 10.

The above-described wheel suspension according to the disclosure is not limited to the embodiment disclosed herein but also encompasses further embodiments having the same function. Thus the attachment of the wheel guide arm to the articulation member is also possible by an integral connection which is fixed in terms of rotation between the wheel guide arm and the articulation member. Thus, in this embodiment, the advantages attributable to the above-described embodiments of the wheel suspension in specific driving situations, such as braking and the effects of impacts on the wheel retained by the wheel suspension, are not present but the lifting of the vehicle structure during acceleration, such as via a wheel hub motor driving a wheel, is in any case reduced, completely prevented or even reversed into a lowering movement.

Moreover, the geometry of the four bar linkage shown in the drawings is naturally not limited to the geometry shown. Rather, for example, by the selectable length of the articulation member and the connecting members and/or by the position of the individual points of articulation on the vehicle structure and on the articulation member, the position of the instantaneous center of rotation may be set in a targeted manner. For example, it is conceivable by appropriate selection of the geometric characteristics of the four bar linkage to fix the instantaneous center of rotation to always be above the point of attachment of the wheel guide arm to the articulation member, in order to reinforce further the positive driving dynamic characteristics mentioned herein of the wheel suspension with a relatively high virtual point of articulation of the wheel guide arm on the vehicle structure. To this end, for example, the spacing between the points of articulation of the connecting members on the structure side could be selected to be smaller than the spacing between the points of articulation between the articulation member and each connecting member. Moreover, it is even conceivable to combine the two connecting members of the four bar linkage, described in the figures, to form one unit, e.g. to form one connecting member, provided the single connecting member is flexible. Such a connecting member, which is able to provide the mobility of the articulation member relative to the vehicle structure within the meaning of the present disclosure, would be produced, for example, from a composite material.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed:

1. A wheel suspension for a motor vehicle, comprising:
a wheel guide arm to which a wheel of the motor vehicle may be rotatably mounted,
an articulation member to which the wheel guide arm is attached, and
at least one connecting member mounted to a structure of the vehicle, wherein the articulation member is connected to and movable relative to the vehicle structure via the at least one connecting member, and the wheel guide arm is attached to the articulation member at a point of attachment by a rotary joint, wherein the rotary joint is rotatable in a first position and is fixed in terms of rotation in a second position.

2. The wheel suspension as claimed in claim 1, wherein the rotary joint is configured to be located in the second position, which is fixed in terms of rotation, during acceleration of the vehicle, and wherein the rotary joint is located in the first position when the vehicle is not accelerating.

3. The wheel suspension as claimed in claim 1, wherein an instantaneous center of rotation of the articulation member, during movement of the articulation member relative to the vehicle structure is located at a location other than the point of attachment of the wheel guide arm to the articulation member.

4. The wheel suspension as claimed in claim 1, wherein the at least one connecting member comprises two connecting members connected to the vehicle structure in an articulated manner, wherein the articulation member is configured as a coupler that connects together in an articulated manner the two connecting members at a point remote from the vehicle structure.

5. The wheel suspension as claimed in claim 4, wherein a spacing between points of articulation of the connecting members on the vehicle structure is greater than spacing between points of articulation between the articulation member and each connecting member.

6. The wheel suspension as claimed in claim 1, wherein the wheel guide arm is a trailing arm.

7. The wheel suspension as claimed in claim 1, wherein the wheel guide arm is part of a twist beam axle or trailing arm axle of the motor vehicle.

8. The wheel suspension as claimed in claim 1, further comprising a wheel mounted on the wheel guide arm via a wheel carrier, wherein a wheel hub motor is supported on the wheel carrier or on the wheel guide arm to drive the wheel.

9. The wheel suspension as claimed in claim 1, further comprising a controller to control the switch position of the rotary joint.

10. A wheel suspension for a motor vehicle, comprising:
   a wheel guide arm to which a wheel of the motor vehicle may be rotatably mounted,
   at least one connecting member pivotably mounted to the vehicle structure, and
   an articulation member connected to the vehicle structure via the at least one connecting member, wherein the articulation member is connected to the wheel guide arm in a changeable manner so that a vertical position of a pivot point of the wheel guide arm may be changed.

11. The wheel suspension as claimed in claim 10, further comprising a changeable rotary joint connecting the wheel guide arm to the articulation member.

12. The wheel suspension as claimed in claim 11, further comprising a controller to control a switch position of the rotary joint.

13. The wheel suspension as claimed in claim 10, wherein the at least one connecting member comprises two connecting members, wherein first ends of the connecting members are connected to the articulation member and second ends of the connecting members are connected to the vehicle structure.

14. The wheel suspension as claimed in claim 13, wherein spacing between points of articulation of the connecting members on the vehicle structure side, where the second ends of the connecting members are pivotably connected to the vehicle structure, is greater than spacing between points of articulation between the articulation member and the first ends of the connecting members.

15. A motor vehicle, comprising:
   a wheel;
   a wheel guide arm on which the wheel is rotatably mounted,
   an articulation member to which the wheel guide arm is attached, and
   at least one connecting member pivotably mounted to a structure of the vehicle, wherein the articulation member is connected to and movable relative to the vehicle structure via the at least one connecting member, and wherein the wheel guide arm is attached to the articulation member at a point of attachment by a rotary joint, wherein the rotary joint is rotatable in a first position and is fixed in terms of rotation in a second position.

* * * * *